(12) United States Patent
Villar Piqué

(10) Patent No.: US 10,008,934 B2
(45) Date of Patent: Jun. 26, 2018

(54) DC-DC CONVERTER WITH FLOATING CAPACITORS

(71) Applicant: NXP B.V., Eindhoven (NL)

(72) Inventor: Gerard Villar Piqué, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/480,703

(22) Filed: Apr. 6, 2017

(65) Prior Publication Data

US 2017/0302180 A1    Oct. 19, 2017

(30) Foreign Application Priority Data

Apr. 13, 2016 (EP) ..................................... 16165172

(51) Int. Cl.

| | |
|---|---|
| *H02M 3/158* | (2006.01) |
| *G05F 1/10* | (2006.01) |
| *G05F 1/56* | (2006.01) |
| *H02M 1/08* | (2006.01) |
| *H02M 1/14* | (2006.01) |

(Continued)

(52) U.S. Cl.
CPC .............. *H02M 3/158* (2013.01); *G05F 1/10* (2013.01); *G05F 1/56* (2013.01); *H02M 1/08* (2013.01); *H02M 1/14* (2013.01); *H02M 1/38* (2013.01); *H02M 3/07* (2013.01); *H02M 2001/0009* (2013.01)

(58) Field of Classification Search
CPC .................................................. H02M 3/158
See application file for complete search history.

(56) References Cited

U.S. PATENT DOCUMENTS

| | | | |
|---|---|---|---|
| 2010/0052538 A1* | 3/2010 | Tanaka | ............... H05B 41/2882 315/82 |
| 2013/0147451 A1 | 6/2013 | Hagan | |

(Continued)

FOREIGN PATENT DOCUMENTS

| | | |
|---|---|---|
| DE | 11 2012 001 746 T5 | 1/2014 |
| WO | WO-2014/032156 A1 | 3/2014 |
| WO | WO-2015/120306 A2 | 8/2015 |

OTHER PUBLICATIONS

Kesarwani, Kapil et al; "A 2-Phase Resonant Switched-Capacitor Converter Delivering 4.3W at 0.6W/mm² with 85% Efficiency"; ISSCC 2014 / Session 4 / DC-DC Converters / 4.5; 3 pages (2014).

(Continued)

*Primary Examiner* — Jue Zhang
*Assistant Examiner* — Trinh Q Dang

(57) ABSTRACT

A DC-DC power converter is described having a power converter input for receiving a supply voltage; a power converter output for outputting a converted supply voltage; a reference input for supplying a reference value; a switch capacitor power converter coupled to the power converter input and the power converter output and comprising at least one switchable capacitor controllable by at least two non-overlapping clock signals; a controller coupled to the switch capacitor power converter, and the power converter output. The controller is configured to generate at least two non-overlapping clock signals and to vary the non-overlapping time duration dependent on the voltage and/or current value of at least one of the power converter output, the reference input, and the power converter input.

17 Claims, 11 Drawing Sheets

(51) Int. Cl.
  *H02M 1/38* (2007.01)
  *H02M 3/07* (2006.01)
  *H02M 1/00* (2006.01)

(56) References Cited

U.S. PATENT DOCUMENTS

| | | |
|---|---|---|
| 2014/0028092 A1 | 1/2014 | Takeshima et al. |
| 2015/0061611 A1* | 3/2015 | Li .................. H02M 3/1588 323/235 |
| 2015/0188448 A1 | 7/2015 | Perreault et al. |
| 2015/0229207 A1 | 8/2015 | Kim et al. |

OTHER PUBLICATIONS

Lan, Po-Hsiang, et al; "A High Efficiency, Wide Workload Range, Digital Off-Time Modulation (DOTM) DC-DC Converter With Asynchronous Power Saving Technique"; IEEE Transactions on Very Large Scale Integration (VLSI) Systems, vol. 21, No. 1; 11 pages (Jan. 2013).

Wang, Kejun et al; "A novel high efficiency low ripple switched-capacitor DC/DC converter"; Analog Integr Circ Sig Process; Springer;14 pages (2012).

* cited by examiner

DC-DC CONVERTER WITH FLOATING CAPACITORS

CROSS-REFERENCE TO RELATED APPLICATIONS

This application claims the priority under 35 U.S.C. § 119 of European patent application no. 16165172.4, filed Apr. 13, 2016 the contents of which are incorporated by reference herein.

FIELD

This disclosure relates to DC-DC Power converters.

BACKGROUND

DC-DC power converters also referred to as DC-DC converters typically can be inductive or based on one or more switched-capacitors. In a switched-capacitor power converter (SCPC), charge is transferred from the input to the output nodes by using a number of floating capacitors. Depending on the signals generated by a control loop, power switches are used to transfer charge from one capacitor to another, and finally to the output node, in time discrete events aligned to two phases of a clock signal. The switching results in a certain amount of ripple to the output voltage, which depends on the amount of charge being transferred and the size of the capacitor at the output node. To avoid short-circuits, there is always a pause between turning off the first power switches and turning on the complementary power switches during the charge transfer between capacitors. This pause or period of time is called non-overlapping time, and has a fixed duration which is insignificant compared to the remainder of the switching period.

SUMMARY

Various aspects are defined in the accompanying claims. In a first aspect there is defined a DC-DC power converter comprising: a switch capacitor power converter coupled to a power converter input and a power converter output and comprising at least one switchable capacitor; a controller coupled to the switch capacitor power converter; and wherein the controller is further configured to generate at least two non-overlapping clock signals and to vary the non-overlapping time duration dependent on the voltage and/or current value of at least one of the power converter output, a reference value, and the power converter input.

In one or more embodiments the controller may be coupled to the power converter input, the power converter output, and a reference input arranged to receive the reference value and the switch capacitor power converter may be controllable by the at least two non-overlapping clock signals.

In one or more embodiments the controller may comprise a error detector, a non-overlapping clock generator and a control module, wherein the error detector comprises a first input coupled for receiving the reference value, a second input coupled to the power converter output and an output coupled to the non-overlapping clock generator and the control module and wherein the control module is configured to generated a modulation control signal for the non-overlapping clock generator and the non-overlapping clock generator is configured to vary the clock frequency dependent on the difference between the output voltage and the reference value.

In one or more embodiments the non-overlapping clock generator comprises a plurality of selectors, each selector having a first input coupled to a respective output of the non-overlapping clock generator, a second input operably coupled to an off-voltage level, and a control input coupled to the controller wherein the controller is configured to modulate the non-overlapping time duration by selecting between the first and second inputs in response to a time reference signal.

In one or more embodiments of the DC-DC power converter the controller comprises a timing reference generator. The timing reference generator may be configured to generate a time reference signal equal to the half the nominal switching period.

In one or more embodiments of the DC-DC power converter the timing reference generator may generate a time reference signal dependent on at least one of a charge time and a discharge time of the switchable capacitor.

In one or more embodiments of the DC-DC power converter the controller may be operable to increase the non-overlapping time duration in response to at least one of a decrease in output current supplied by the DC-DC power converter, a decrease in the reference setting value, and an increase in the input voltage of the DC-DC converter.

In one or more embodiments of the DC-DC power converter the controller may be operable to decrease the non-overlapping time duration in response to at least one of an increase in the output current supplied by the DC-DC power converter, an increase in the reference setting, and a decrease in the input voltage of the DC-DC converter.

In one or more embodiments the DC-DC power converter may further comprise an output capacitor coupled to the output of the switch capacitor power converter. In one or more embodiments of the DC-DC power converter the timing reference generator is coupled to the oscillator.

In a second aspect there is described a method of controlling a DC-DC power converter comprising a switch capacitor power converter having a switchable capacitor, the method comprising: providing at least two non-overlapping clocks to the switch capacitor power converter, and modulating the non-overlapping time duration of the non-overlapping time clocks in dependence on the voltage and/or the current of at least one of the power converter output, the power converter input and a reference value.

In one or more embodiments, the method may further comprise decreasing the non-overlapping time duration in response at least one of an increase in the output current provided by the DC-DC power converter, an increase in the reference value, and a decrease in the input voltage.

In one or more embodiments, the method may further comprise increasing the non-overlapping time duration in response to at least one of a decrease in the output current provided by the DC-DC power converter, a decrease in the reference value, and an increase in the input voltage.

In one or more embodiments of the method modulating the non-overlapping time duration may comprise generating a time reference signal dependent on at least one of the charge time and discharge time of the switchable capacitor.

BRIEF DESCRIPTION OF DRAWINGS

In the figures and description like reference numerals refer to like features. Embodiments of the invention are now described in detail, by way of example only, illustrated by the accompanying drawings in which.

DESCRIPTION

Figure 1A:
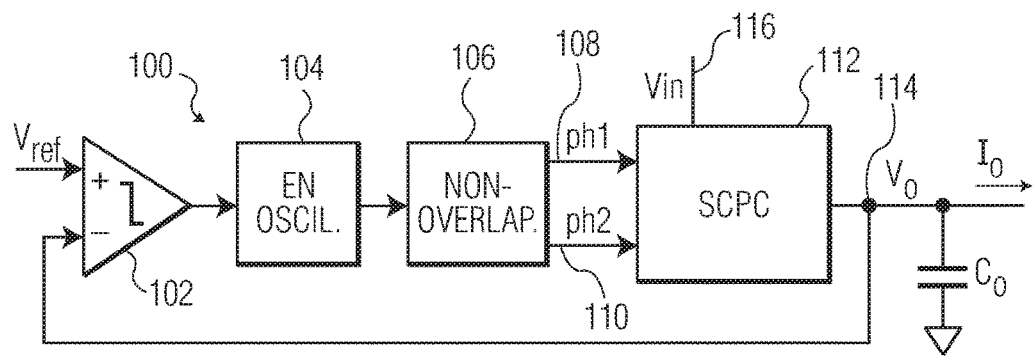
FIG. 1A shows a typical example of a DC-DC converter including a switch capacitor power converter with a pulse frequency modulated (PFM) control loop.

FIG. 1A shows a typical example of a DC-DC converter 100 including a switch capacitor power converter (SCPC) 112 that uses pulse-frequency modulated (PFM) control. A comparator 102 has a first input operably connected to a voltage reference Vref and a second input connected to an output 114 of the DC-DC converter 100 for monitoring the output voltage Vo. The output of the comparator 102 is connected to an oscillator 104. The output of the oscillator 104 is connected to a non-overlapping clock phase generator 106. The two outputs 108, 110 of the non-overlapping clock phase generator 106 are connected to the switch capacitor power converter 112, which may convert the power from Vin 116 to Vo 114. The two outputs 108, 110 of the non-overlapping clock phase generator 106 may generate the non-overlapping clocks denoted ph1 and ph2 respectively. The output of the SCPC 114 may be connected to a first terminal of an output capacitor Co. A second terminal of the output capacitor Co may be connected to a ground potential.

Figure 1B:
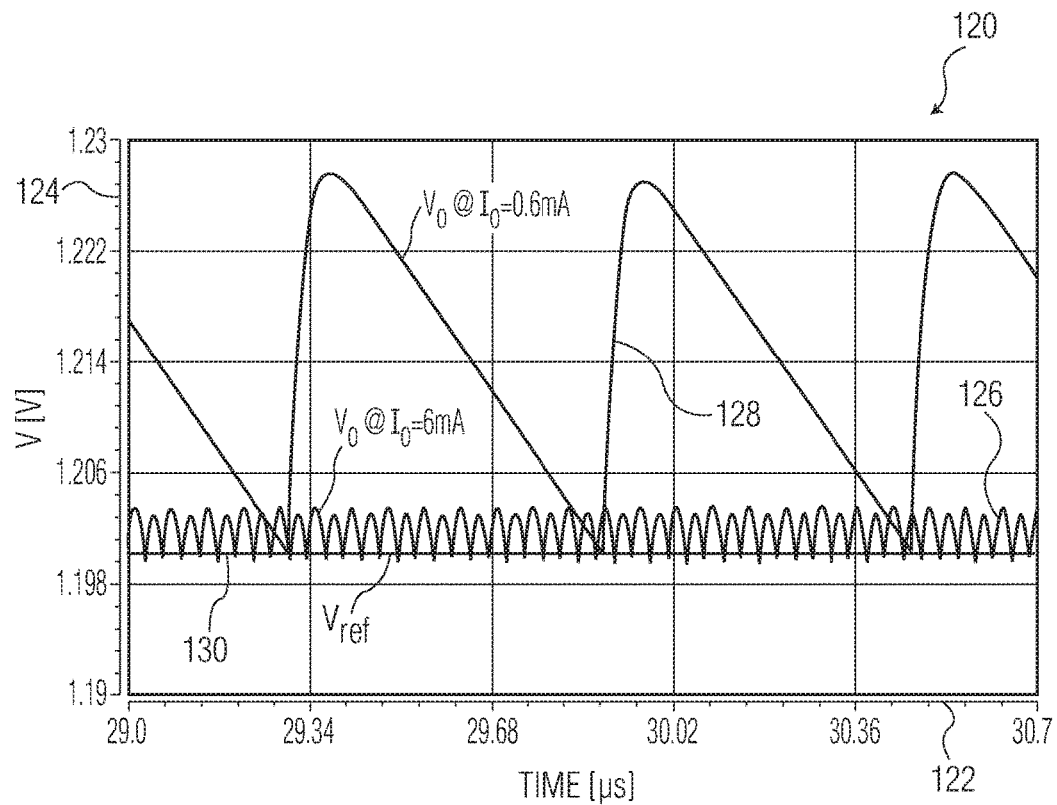
FIG. 1B shows a graph illustrating the output ripple of the switch capacitor power converter of FIG. 1A.
Figure 1C:
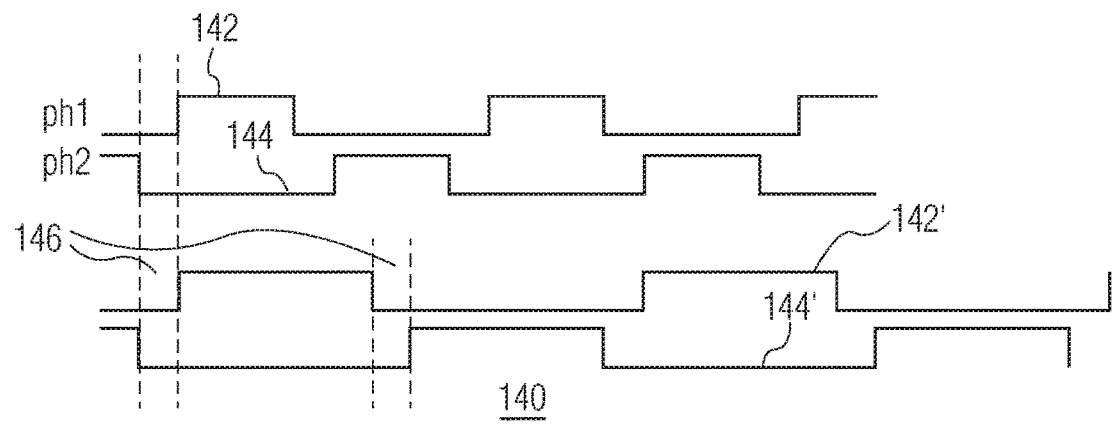
FIG. 1C is an example waveform of a two-phase non-overlapping clock.
Figure 1D:
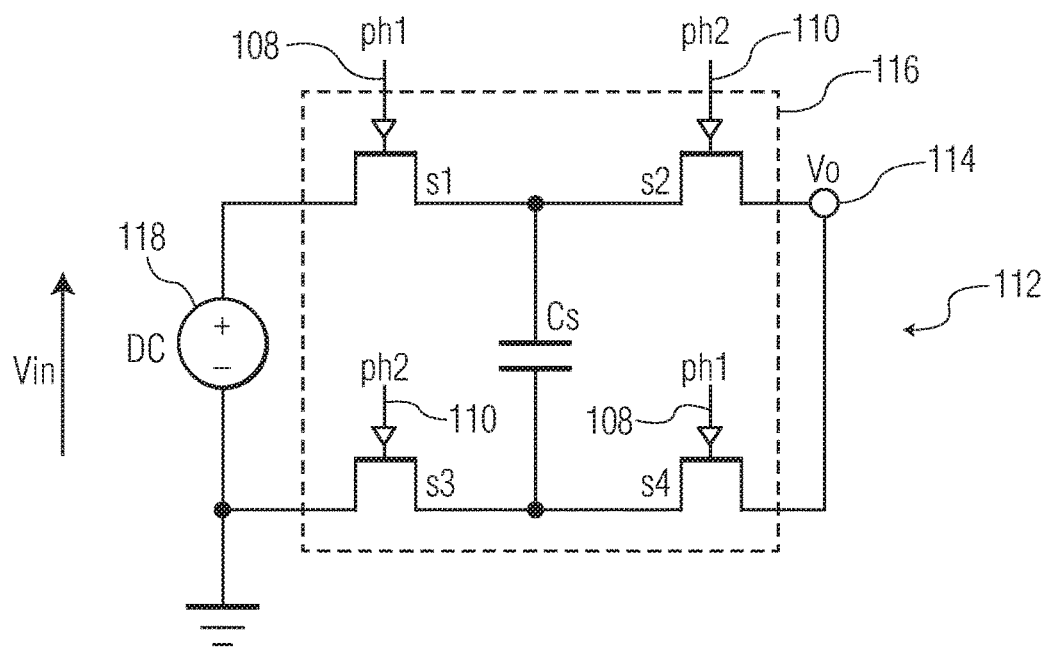
FIG. 1D shows an example circuit of a SCPC including an example implementation of a switchable capacitor.

FIG. 1D shows further detail of an example switch capacitor power converter 112. A first series arrangement of NMOS transistors S1 and S2 may be connected between an input voltage source 118 and the SCPC output 114. A second series arrangement of NMOS transistors S3 and S4 may be connected between the SCPC output 114 and a ground potential. A first terminal of capacitor Cs may be connected to a common connection between transistors S1 and S2. A second terminal of the capacitor Cs may be connected to a common connection between transistors S3 and S4. The gate terminals of NMOS transistors S1 and S4 may be connected to the ph1 non-overlapping clock via connection 108. The gate terminals of NMOS transistors S2 and S3 may be connected to the ph2 non-overlapping clock via connection 110. The capacitor Cs may be considered as a floating capacitor since it can be isolated from the input voltage source 118, the SCPC output, and the ground potential during operation. Capacitor Cs in combination with transistor S1, S2, S3 and S4 may be considered to form a switchable capacitor 116.

In this example switch capacitor power converter 112, during operation when ph1 is a logic high value then NMOS transistors S1 and S4 are enabled or switched on, the SCPC output 114 is coupled to the second terminal of the capacitor Cs and the input voltage Vin is supplied to the first terminal of the capacitor Cs. When ph2 is a logic high value then NMOS transistors S2 and S3 are enabled or switched on, the SCPC output 114 is coupled to the first terminal of the capacitor Cs and the ground potential is supplied to the other terminal. The capacitor Cs is charged to a voltage equal to the difference between Vin and Vo during the first phase of the operation (S1 and S4 are on). During the second phase the accumulated charge in Cs is transferred to the output voltage node (S2 and S3 are on). This alternate operation results in a charge transfer from input to output of the SCPC in time discrete events. During the non-overlapping time when both ph1 and ph2 are logic low value then all NMOS transistors S1 to S4 are switched off and the capacitor Cs is floating. It will be appreciated that in other implementations multiple capacitors and switch arrangements using other transistors for example PMOS transistors, or other elements for forming switches may be used in a switch capacitor power converter.

In operation of the DC-DC converter 100, the output voltage Vo of the SCPC 112 may be monitored continuously with the voltage comparator or error amplifier 102, which compares the output voltage Vo with a reference voltage Vref corresponding to the desired output voltage value. The voltage comparator or error amplifier 102 may be considered to act as an error detector. In other typical examples the comparator may be a clocked comparator that compares the output at discrete time intervals. In other examples the comparator may be an error amplifier for continuous control of the frequency of the oscillator or a mixed-signal circuit including an analog-to-digital converter and additional digital circuitry. The output of the comparator 102 is used to enable and disable the oscillator 104, which may be set to run at a fixed frequency, which may for example be 10 MHz to 20 MHz. The oscillator may be enabled when the output voltage Vo is below the reference voltage Vref and disabled if the output voltage Vo is above Vref. The reference voltage Vref may be for example 1.2 volts. The output of the oscillator 104 is connected to the non-overlapping clock phase generator 106 which that generates two complimentary signals (ph1 and ph2) required to drive the power switches S1, S2, S3, S4, with a non-overlapping pause to avoid short-circuits. In other examples, the comparator output may be a variable voltage that controls a voltage controlled oscillator to modulate the frequency dependent on the difference between Vo and Vref. FIG. 1C shows example waveforms for a two-phase non-overlapping clock system 140. Waveforms 142, 144 shows the relationship between clocks ph1 and ph2 respectively in a first mode of operation. The non-overlapping time duration is indicated by regions 146. If the reference voltage Vref changes to a lower value corresponding to a lower required output voltage, the time period of the clocks ph1 and ph2 increases as shown in waveforms 142',144' which will lead to a reduction in the output voltage Vo.

FIG. 1B shows the variation of output voltage for 2 different values of output current 120. The x-axis 122 indicates time in microseconds between a value of 29 us and 30.7 us corresponding to a duration of approximately 1.7 us. The y-axis 124 indicates the output voltage Vo changing in a range between 1.19 volts and 1.23 volts. The voltage reference value of 1.2 volts in this example is shown be horizontal line 130. The graph line 126 shows the variation in output voltage for an output current of 6 mA. The graph line 128 shows the variation in output voltage for an output current of 0.6 mA. As can be seen from graph 120, the voltage ripple at a lower output current of 0.6 mA shown by line 128 is approximately 25 mV peak-to-peak compared to the voltage ripple at 6 mA of 4 mV peak-to-peak.

Figure 2A:
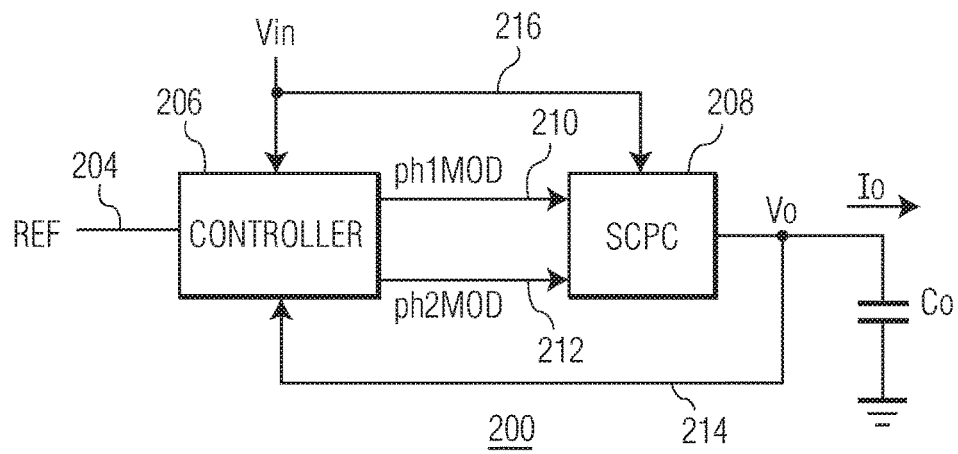
FIG. 2A shows a DC-DC converter according to an embodiment and FIG. 2B an illustration of the modulated clock waveforms.

FIG. 2A shows a DC-DC power converter 200 according to an embodiment. A controller 206 may have a first input 204 operably connected to a voltage reference, a second input connected to a power converter output 214 of the DC-DC power converter 200, and a third input connected to a DC-DC power converter input 216. The clock outputs 210,212 of the controller 206 may be connected to a switch capacitor power converter (SCPC) 208. The switch capacitor power converter 208 may have an input connected to the DC-DC converter input 216. The output of the switched capacitor power converter 208 may be connected to the output 214 of the DC-DC converter 200. An output capacitor Co may be connected between the output 214 and a supply rail which may operably be at a ground potential.

In operation, the controller 206 may vary the frequency of the clock generator 206 in response to the difference between the output voltage and the reference voltage. The clock generator may output a first phase of a non-overlapping clock ph1mod from a first clock output 210 and a second phase of a non-overlapping clock ph2mod from a second clock output 212. The controller 206 may also vary the non-overlapping time duration between ph1mod and ph2mod. The controller 206 may detect the output current drawn from the DC-DC converter 200 by a connected load (not shown) either directly by measuring a current value of Io or indirectly from detecting the value of voltage output Vo. The controller 206 may also detect the changes in the input voltage on DC-DC converter input 216 or the reference value setting on the reference input 204. In other examples the controller may have a predetermined reference value. The controller 206 may vary the non-overlapping time duration of the two clock phases in response to the output current $I_o$ changing, the input voltage changing or the reference setting changing. For example if the controller 206 detects an increase in the current Io, the controller 206 may reduce the non-overlap time period between ph1mod and ph2mod.

Consequently when the output current Io reduces and the switching frequency reduces accordingly, the operation of the SCPC power stage 208 is effectively frozen in the non-overlapping state, that is to say when all the floating capacitors are disconnected, as soon as or shortly after the nominal charge/discharge time has passed.

Figure 2B:
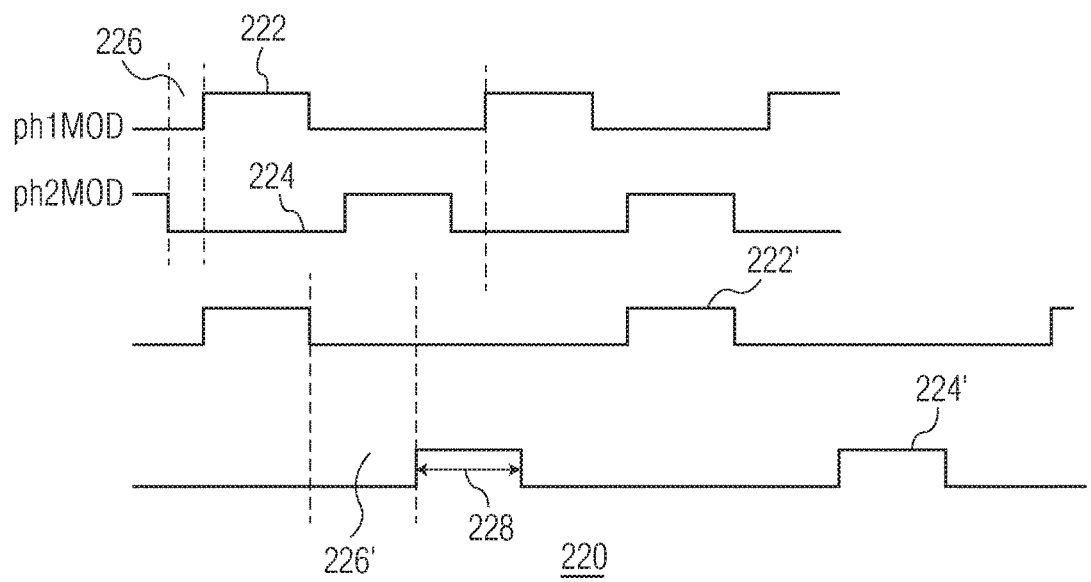

FIG. 2B shows an example waveform of the non-overlapping modulated clocks 220 for DC-DC converter 200. Waveforms 222, 224 shows the relationship between clocks ph1mod and ph2mod respectively in a first mode of operation. The non-overlapping time duration is indicated by regions 226,226'. If a lower output voltage or current is required, the time period of the clocks ph1mod and ph2mod may increase as shown in waveforms 222' and 224'. By increasing the non-overlapping time region 226', the time period 228 corresponding to the on-period of the clock phases 222' and 224' may correspond to a discharge/charge time of a switchable capacitor in the SCPC 208.

In this way the charge/discharge time of the floating capacitors in the SCPC 208 becomes independent of the output current and operating switching frequency. The switching frequency of the DC-DC converter 200 is also being modulated according to the output current, input voltage or reference setting; but instead of modulating the charge/discharge times of the floating capacitors, the controller 206 modulates the duration of the non-overlapping time. This allows a smaller output capacitor Co to be used for a given maximum required output voltage ripple than would otherwise be the case. The DC-DC power converter 200 may reduce the amount of voltage ripple by 50%. In a conventional DC-DC converter, to achieve the same result an output capacitor having twice the capacitance may be required.

Figure 3:
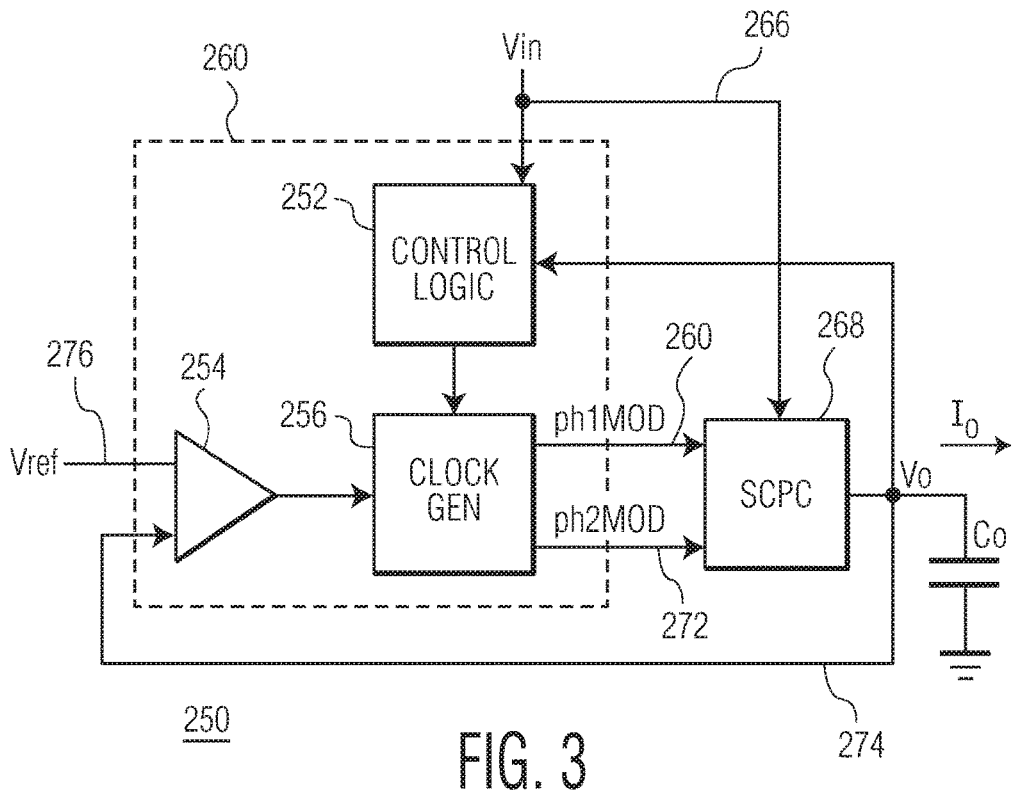
FIG. 3 shows a DC-DC converter according to an embodiment.

FIG. 3 shows a DC-DC converter 250 according to an embodiment. A controller 260 may include control logic 252, a comparator 254 and a clock generator 256. The comparator 254 may have a first input operably connected to a reference input 276 which may be a voltage reference, and a second input connected to an output 274 of the DC-DC converter 250. The output of comparator 254 may be connected to the clock generator 256. The modulated clock outputs 260,272 of the clock generator 256 may be connected to a switch capacitor power converter 268. The output of the switched capacitor power converter 268 may be connected to the output 274 of the DC-DC converter 250. An output capacitor Co may be connected between the output 274 and a supply rail which may operably be at a ground potential. The output of the DC-DC converter 250 may be connected to the control logic circuit 252. The control logic circuit 252 may be connected to the clock generator 256.

In operation the comparator 254 may provide a control signal to vary the frequency of the clock generator 256 in response to the difference between the output voltage and the reference voltage. The clock generator may output a first phase of a non-overlapping clock ph1mod from a first clock generator output 260 and a second phase of a non-overlapping clock ph2mod 272 from a second clock generator output 272. The controller 206 may detect the output current drawn from the DC-DC converter 250 by a connected load (not shown) either directly by measuring a current value of Io or indirectly from detecting the value of voltage output Vo. The controller 260 may also detect the changes in the input voltage on DC-DC converter input 266 or the reference setting on reference input 276 which may be a voltage reference. The controller 260 may vary the non-overlapping time duration of the two clock phases by altering the duty cycle of the clock phases in response to a change in the output current Io, the input voltage or the reference setting.

For example if the controller 260 detects an increase in the current $I_o$, the controller 260 may reduce the non-overlap time period between ph1mod and ph2mod. When the output current Io reduces, the switching frequency may reduce, the operation of the SCPC power stage 268 is effectively frozen in the non-overlapping state, that is to say when all the floating capacitors are disconnected, as soon as or shortly after the nominal charge/discharge time has passed. As a result the non-overlapping time increases.

In this way the charge/discharge time of the floating capacitors in the SCPC 268 becomes independent of the output current and operating switching frequency. The switching frequency of the DC-DC converter 250 is also being modulated according to the output current, input voltage or reference setting; but instead of modulating the charge/discharge times of the floating capacitors, the controller modulates the duration of the non-overlapping time. This allows a smaller output capacitor Co to be used for a given maximum required output voltage ripple than would otherwise be the case.

Figure 4:
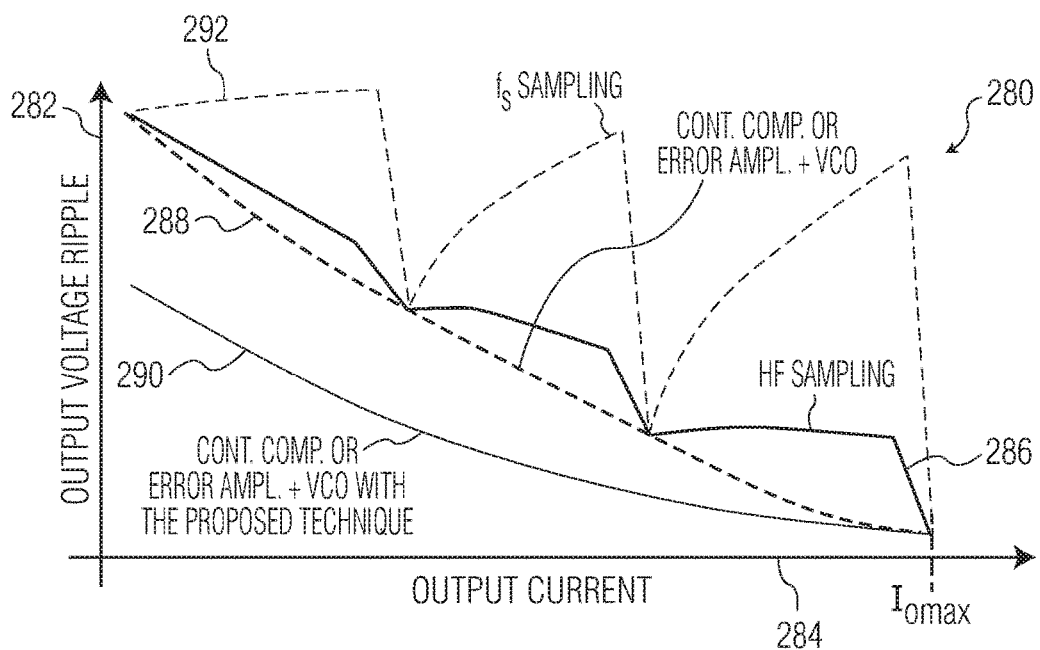
FIG. 4 shows a graph of the qualitative evolution of output voltage ripple vs output current for various PFM control loops.

The variation of the output voltage ripple with output current for embodiments of the DC-DC converter described herein compared with other DC-DC converters is further explained and qualitatively illustrated with respect to FIG. 4. Graph 280 has an x axis 284 showing output current and a y-axis 282 showing the amount of output voltage ripple. Line 292 shows a typical DC-DC converter with a clocked comparison stage sampled at a frequency fs (fs being equal to the nominal switching frequency of the DC-DC converter). Line 286 shows a typical DC-DC converter with a clocked comparison stage sampled at a higher sampling frequency than fs. Line 288 shows a typical DC-DC converter with a continuous comparison stage similar to that described in FIG. 1a. Line 290 shows a qualitative variation in output voltage ripple with respect to output current for embodiments of the DC-DC converter described herein.

The DC-DC converters having responses shown in graph 280, use pulse-frequency modulation (PFM) to regulate the output voltage of a SCPC. The output voltage ripple may only reach its minimum value when the output current is maximum. As soon as the output current reduces, there is an increase of the output ripple. Depending on the implementation of the control loop, different effects can be observed at the output.

For example if the control loop of a DC-DC converter samples the output, for example by using a clocked voltage comparator, the increase of the output ripple might be quite sudden due to the finite sampling frequency of the output voltage as shown in lines 292, 286. This problem can be minimized by increasing the sampling frequency, resulting in a reduced voltage ripple shown in line 286 when compared to line 292. However, this may result in increased power consumption due to the higher sampling frequency.

If the control loop continuously monitors the output voltage as described in DC-DC converter 100 and shown in line 288, the increase of the output voltage ripple as the output current decreases may still occur but in a smoother shape than in previous case.

The increase of output voltage ripple when the output current becomes smaller may be caused because the injection of charge to the output node occurs in a finite amount of time. During this time, if the output current is high, a significant amount of charge flows directly to the output and never reaches the output capacitor; which means that it does not increase the output voltage. At low output current, the charge that flows directly to the output during the charge injection event becomes insignificant, resulting in almost all the charge being accumulated at the output node (which increases the output ripple).

The increase of output voltage ripple when the output current becomes smaller may be due to the reduced switching frequency of the DC-DC converter. This may result in an increase of the charge/discharge times of the capacitors and a consequent increase in the charge variation stored in the floating capacitors in the SCPC, which results in a higher output ripple. The DC-DC converter 250 decouples the charge-discharge time of capacitors from the switching frequency of the DC-DC converter resulting in a reduced output voltage ripple as indicated qualitatively by line 290.

Figure 5A:
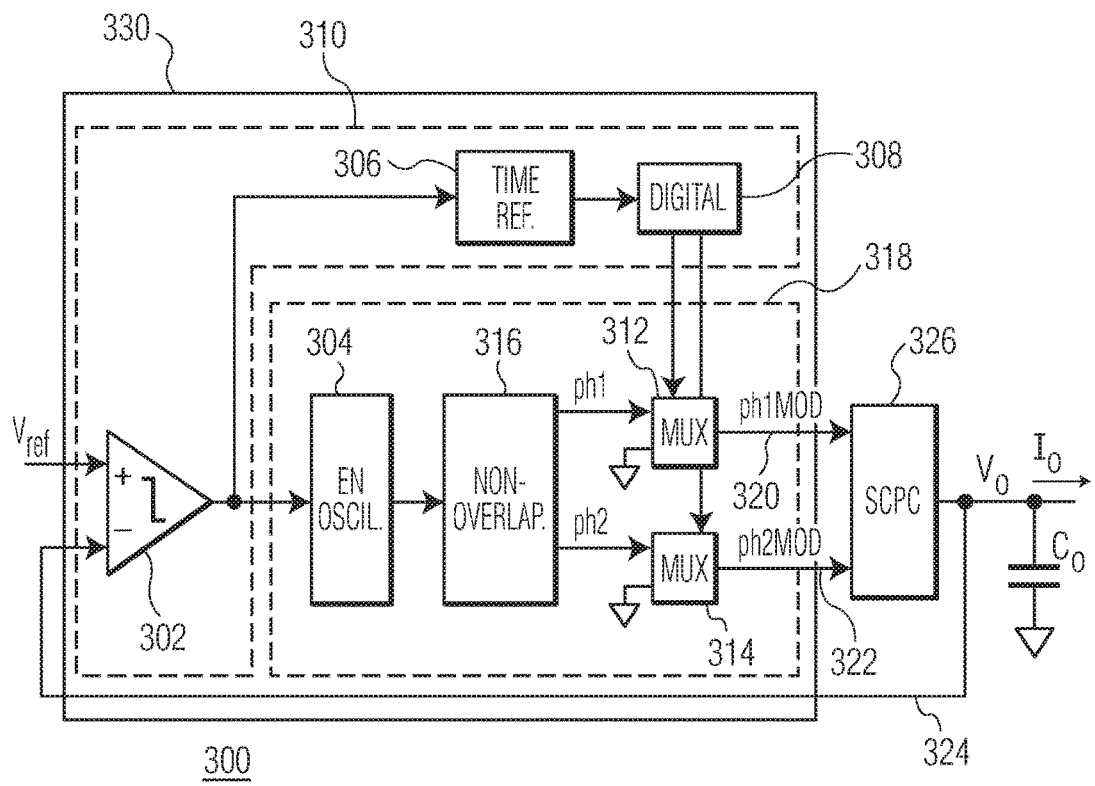
FIG. 5A shows a DC-DC converter according to an embodiment.

FIG. 5aA shows a DC-DC converter 300 according to an embodiment including a switch capacitor power converter (SCPC) 326 that uses pulse-frequency modulated (PFM) control.

A controller 330 may include a control circuit 310 and a clock generator 318.

The control circuit 310 may include a comparator 302 a time reference 306 and a digital controller 308. The clock generator 318 may include an oscillator 304, a non-overlapping clock phase generator 316, and multiplexers 312, 314.

A comparator 302 has a first input operably connected to a voltage reference and a second input connected to the output 324 of the DC-DC converter 300 for monitoring the output voltage Vo. The output of the comparator or error amplifier 302 may be connected to an oscillator 304 such as a voltage controlled oscillator. The output of the oscillator 304 is connected to a non-overlapping clock phase generator 316. Each of the two outputs of the non-overlapping clock phase generator 316 are connected to a respective first input of a respective multiplexer 312,314. A second input of each of the multiplexers 312,314 is connected to a reference node which may operably be at a ground potential or any other off voltage value that is required to turn-off the corresponding power switches of the switch capacitor power converter 326. The outputs 320, 322 of the multiplexers 312,314 may be connected to the switch capacitor power converter 326. A control input of the multiplexers 312, 314 may be connected to a digital control circuit 308. As will be appreciated, the multiplexers act as a selection circuit which in other examples may be implemented using other logic circuitry or other type of signal selector. The digital control circuit 308 may be connected to a time reference 306. The time reference 306 may generate a signal having a duration of half the nominal switching period. The nominal switching period may be equal to the switching period at which the switch capacitor power converter can provide the maximum output power for which it has been designed.

The output 324 of the switch capacitor power converter 326 may be connected to a first terminal of an output capacitor Co. A second terminal of the output capacitor Co may be connected to a ground potential. The time reference 306 and digital control circuit 308 may be included in a controller 310. The oscillator 304, non-overlapping clock phase generator 316, first and second multiplexers 312, 314 may be included in a clock generator 318.

Figure 5B:
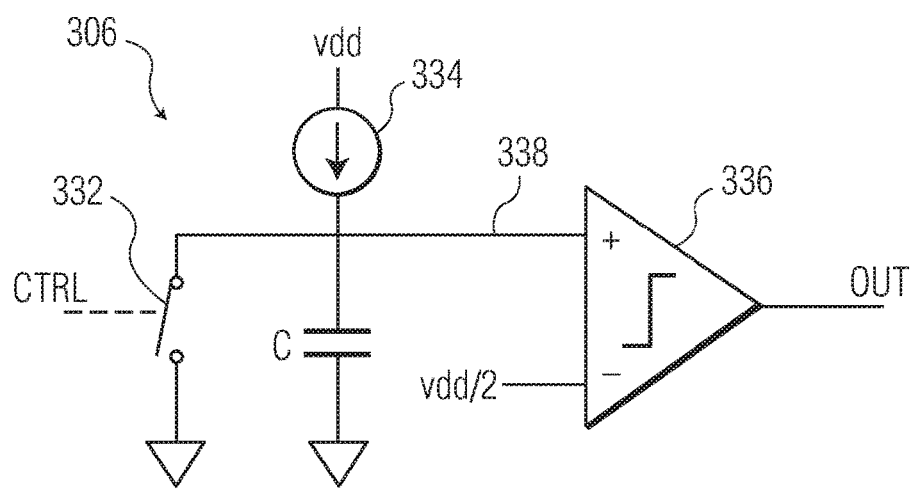
FIG. 5B shows an example time reference circuit for the embodiment of FIG. 5A.

FIG. 5B shows an example timing reference circuit 306. A switch 332 which may typically be implemented by a transistor may be arranged between a ground potential and a non-inverting input of a comparator 336. An inverting input of the comparator 336 may be connected when in operation to a reference voltage for example half the supply voltage value. A current source 334 may be connected to the non-inverting input 338 of the comparator 336. A capacitor C may be connected between the non-inverting input 338 and a ground potential.

Figure 6A:
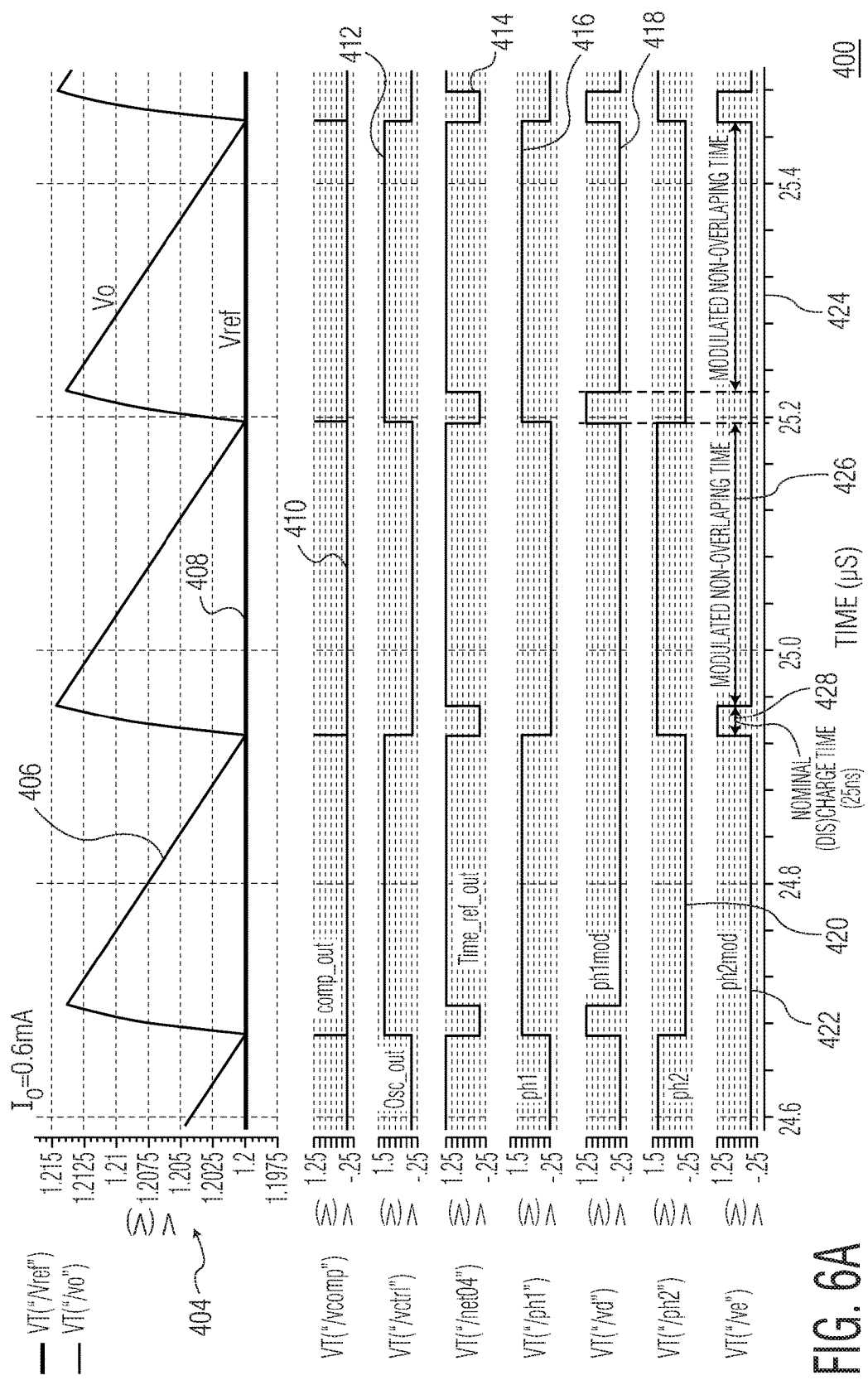
FIG. 6A shows a simulation of the behaviour of the DC-DC converter of FIG. 5A for an output current of 0.6 mA.
Figure 6B:
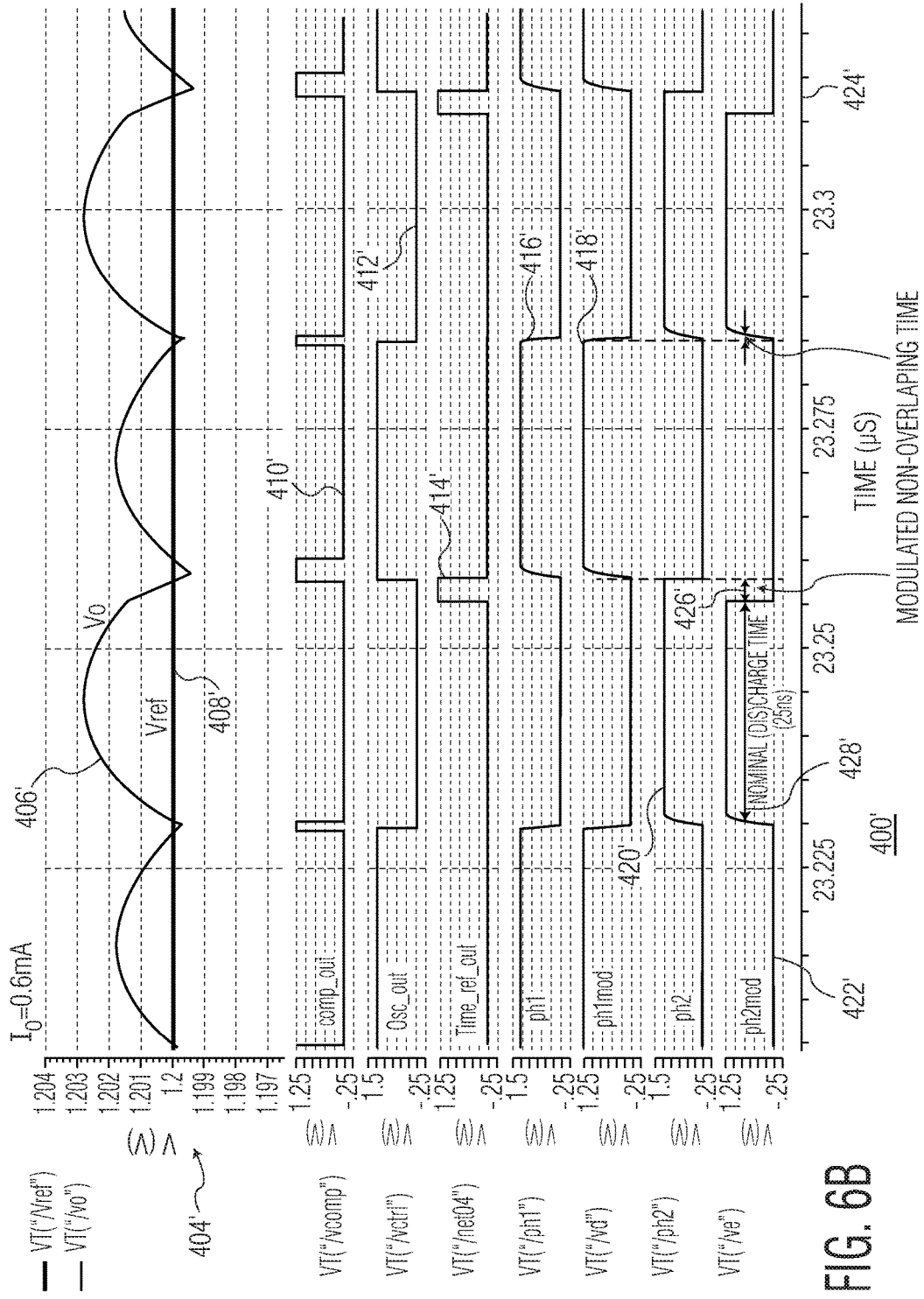
FIG. 6B shows a simulation of the behaviour of the DC-DC converter of FIG. 5A for an output current of 6 mA.

The operation of DC-DC converter 300 is described with reference to FIGS. 6A and 6B which have simulation results 400, 400' for an output current of 0.6 mA and 6 mA respectively. The y axes 404,404' show the voltage value for the various signals, and the x-axes 424,424' indicate time.

In operation, the comparator 302 may provide a control signal to enable the oscillator 304 in response to the output voltage Vo shown on lines 406,406' being at a level below the reference voltage Vref shown on lines 408,408'. The output of the comparator 302 shown on lines 410,410' may trigger the time reference circuit 306 by closing the switch 332. The time reference circuit 306 is a monostable circuit and generates a pulse of a duration determined by the capacitance C and the value of current provided by the current source 334. The non-overlapping clock phase generator 316 may output a first phase of a non-overlapping clock ph1 shown on lines 416,416' and a second phase of a non-overlapping clock ph2 shown on lines 420,420' The digital control circuit 308 may, in response to the timing reference 306, control the multiplexers 312,314 to output either the non-overlapping clock signals ph1, ph2 or a reference potential which may be a ground potential, or any other off-voltage value that turns off the corresponding power switches in the switch capacitor power converter 326. The signals at the multiplexer outputs 320,322 are non-overlapping clock phases ph1mod shown on lines 418,418' and ph2mod shown on lines 422,422' which may have varying non-overlapping time dependent on the clock frequency. Because the timing reference 306 may have a predetermined duration 428,428' which may be fixed or programmable, at lower switching frequencies which may correspond to lower output current, the non-overlap time 426 between the clocks ph1mod and ph2mod may increase. At higher switching frequencies the non-overlapping time 426' between ph1mod and ph2mod may reduce.

During the non-overlapping time of ph1mod and ph2mod, the NMOS FET switches in the SCPC 308 will be switched off so the capacitors will be in a floating state after a nominal charge/discharge time has passed. It will be appreciated that in other examples, other transistors used, for example PMOS FET switches may be used in which case a supply potential or voltage (or any other required potential) would be required to switch off the PMOS FET switches and so leave the floating capacitors in the SCPC 326 disconnected or isolated from the inputs and outputs of the SCPC 326.

In other examples, the time reference may be connected to the oscillator and the signal derived from the oscillator (or the other way around). Alternatively the timing reference may include an auxiliary oscillator (not shown) coupled to the comparator. Other examples may combine the oscillator and time reference in a single circuit.

Consequently when the output current Io reduces and the switching frequency reduces accordingly, the operation of the SCPC power stage 326 is effectively frozen in the non-overlapping state and so all the floating capacitors in the SCPC are disconnected from both SCPC inputs and outputs and ground potential, as soon as, or shortly after the nominal charge/discharge time has passed.

The DC-DC converter 300 allows a smaller output capacitor Co to be used for a given maximum required output voltage ripple than would otherwise be the case. The DC-DC converter 300 may reduce the amount of output voltage ripple by 50% compared to a conventional DC-DC converter for the same value of output capacitor Co. The improvement in voltage ripple at low output currents is further shown in FIGS. 7A to 7C.

Figure 7A:
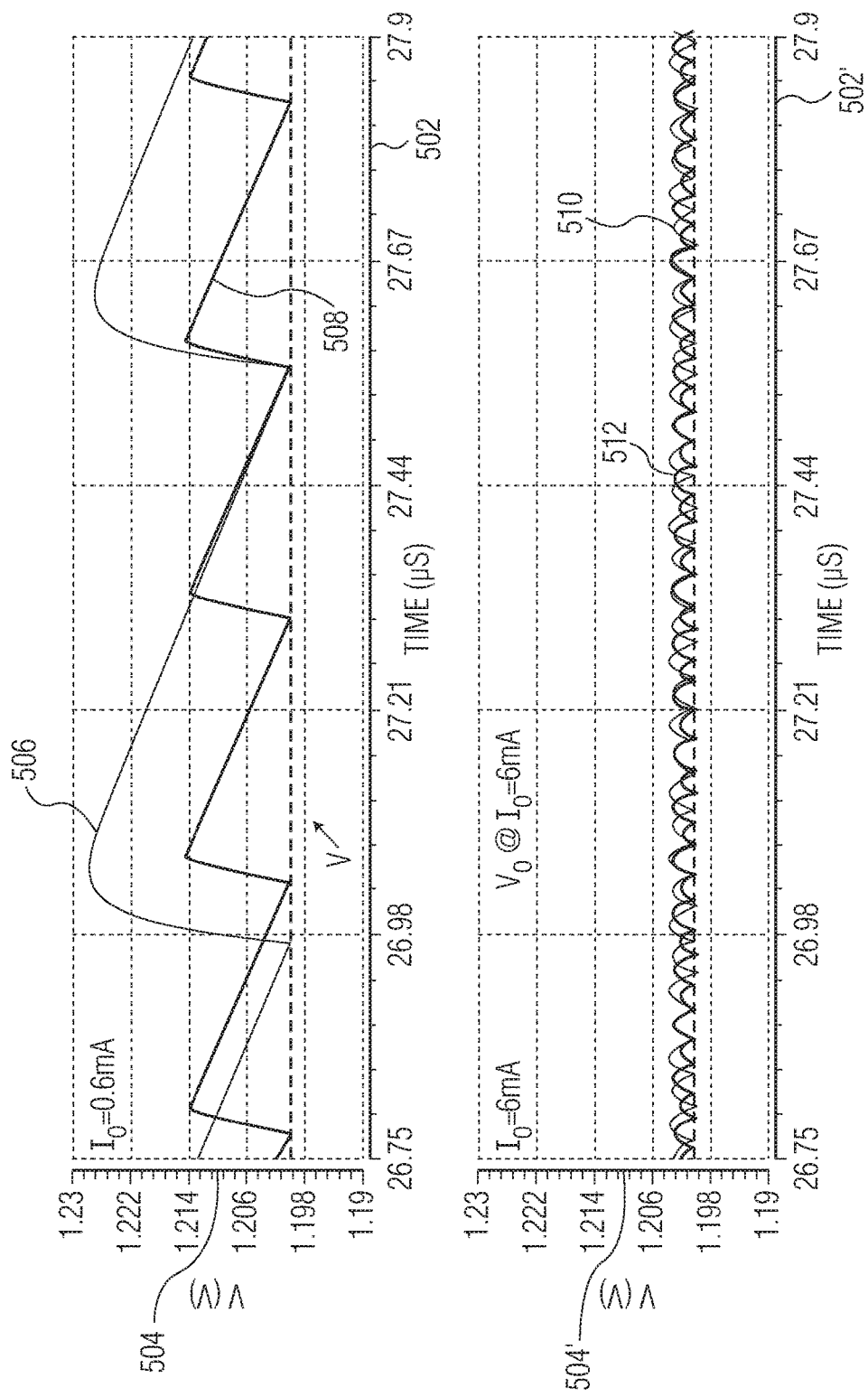
FIG. 7A shows a graph illustrating the difference in output ripple between the DC-DC converters of FIG. 5A and FIG. 1A, for 2 different values of output current.

FIG. 7A shows the variation of output voltage for two different values of output current 500 for the DC-DC converter 300 and the DC-DC converter 100. The x-axis 502, 502' indicates time in microseconds between a value of approximately 27 us and 28 us i.e. a duration of approximately 1 us. The y-axis 504, 504' each indicate the voltage change in a range between 1.19 volts and 1.23 volts. The graph line 506 shows the variation in output voltage for an output current of 0.6 mA for the DC-DC converter 100. The graph line 508 shows the variation in output voltage ripple for an output current of 0.6 mA for the DC-DC converter 300. The peak to peak voltage ripple for DC-DC converter 300 is approximately 15 mV compared to approximately 27 mV for DC-DC converter 100.

The graph line 510 shows the variation in output voltage for an output current of 6 mA for the DC-DC converter 100. The graph line 512 shows the variation in output voltage for an output current of 6 mA for the DC-DC converter 300. At this higher current level the peak to peak voltage levels in each case are similar.

Figure 7B:
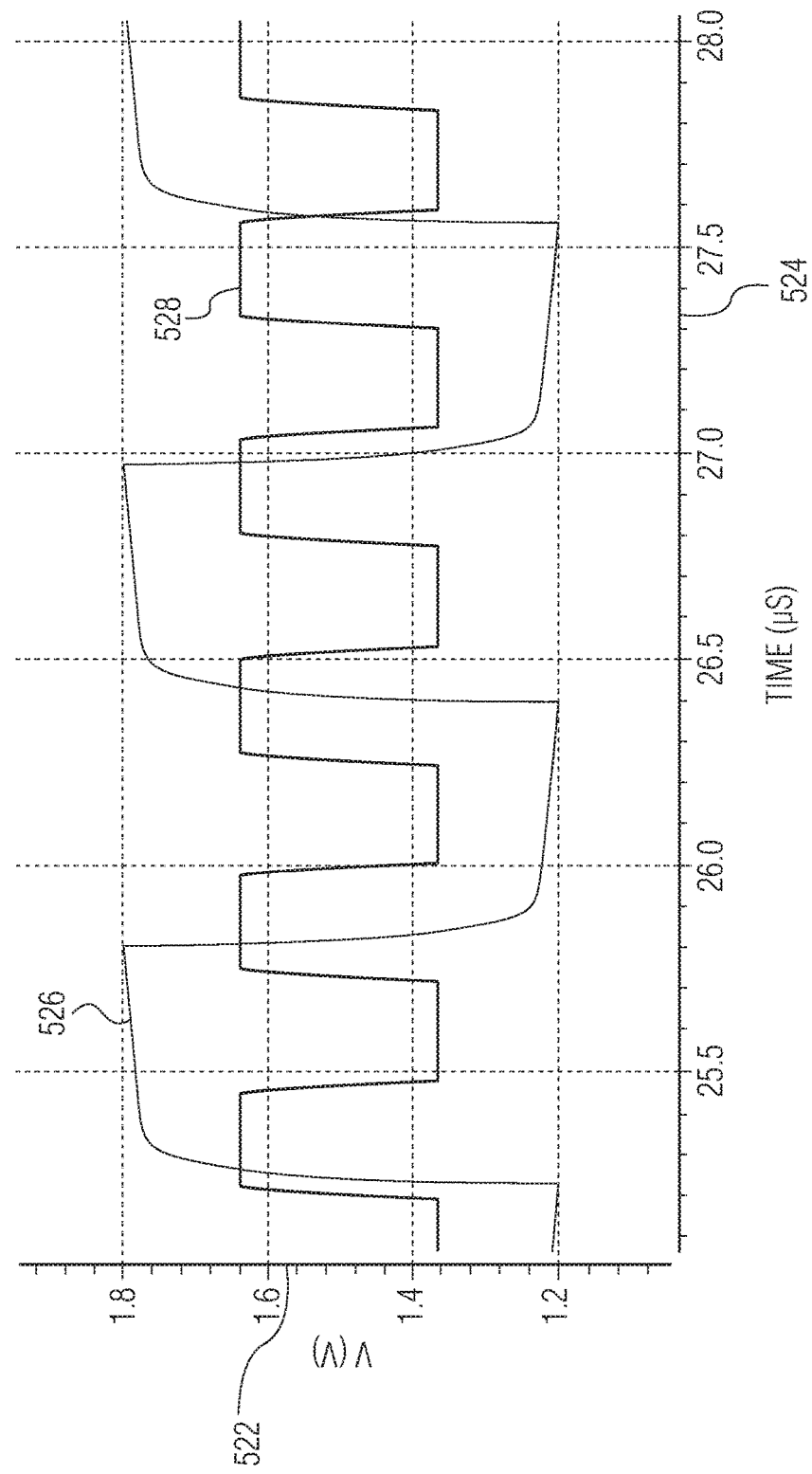
FIG. 7B shows a graph illustrating the voltage swing for the floating capacitor of the DC-DC converters of FIG. 5A and FIG. 1A.

FIG. 7B shows a graph 520 the voltage swing on the floating capacitors in the DC-Converter 100 and the DC-DC Converter 300 for an output current Io of 0.6 mA. The x-axis 374 indicates time in microseconds between a value of 25 us and 29 us i.e. a duration of approximately 4 us. The y-axis 522 each indicate the voltage change in a range between 1.1 volts and 1.9 volts. The graph line 526 shows the variation in voltage on the floating capacitors in the SCPC for an output current of 0.6 mA for the DC-DC converter 100. The graph line 528 shows the variation in output voltage floating capacitors in the SCPC for an output current of 0.6 mA for the DC-DC converter 300. The peak to peak voltage on the floating capacitors for DC-DC converter 300 is approximately 0.28 V compared to approximately 0.6 V for DC-DC converter 100.

Figure 7C:
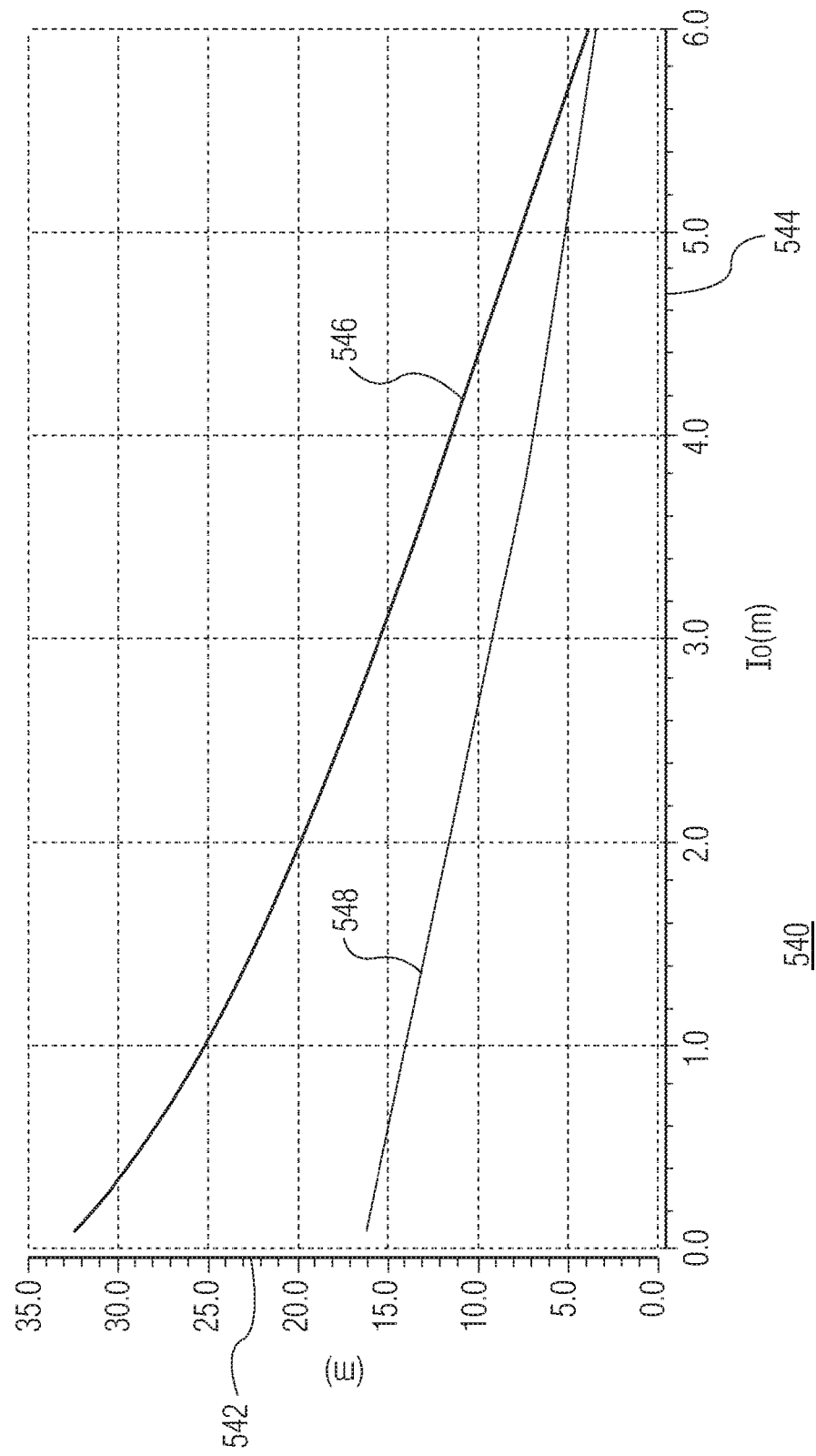
FIG. 7C shows a graph illustrating the variation of output ripple vs output current for the DC-DC converters of FIG. 5A and FIG. 1.

FIG. 7C shows a graph 540 indicating a comparison of output voltage ripple vs output current for the DC-DC converter 100 and DC-DC converter 300. The x-axis 544 indicates the output current between a value of 0 and 6 mA. The y-axis 542 indicates the voltage ripple value between 0 and 35 mV. Line 546 shows that for DC-DC converter 100 the ripple voltage decreases from a value of 32 mV at 0.1 mA output current to approximately 4 mV at 6 mA output current. Line 548 shows that for DC-DC converter 300 the ripple voltage decreases from a value of 16 mV at 0.1 mA output current to approximately 4 mV at 6 mA output current.

Figure 8:
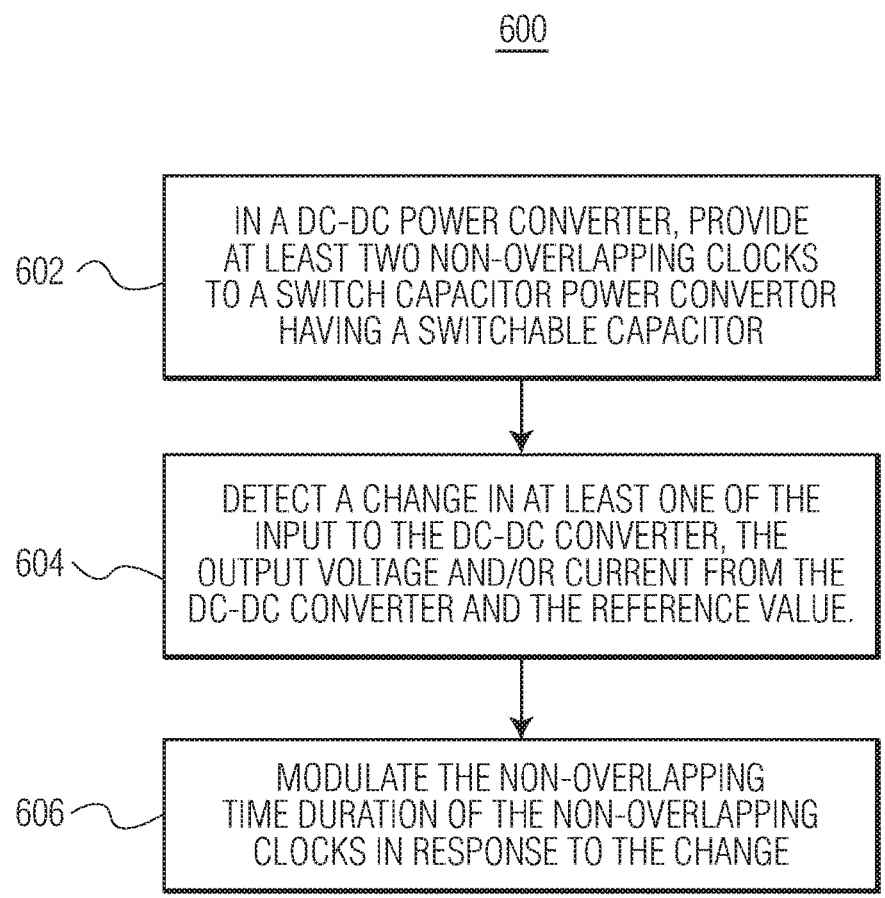
FIG. 8 shows a method of controlling a DC-DC converter according to an embodiment.

FIG. 8 shows a method 600 of operating a DC-DC converter according to an embodiment. In step 602 two non-overlapping clocks may be provided to a switch capacitor power converter having a switchable capacitor. In step 604 a change in the output current drawn from the DC-DC converter, or the input voltage, or the reference setting corresponding to the required output voltage may be detected either directly or indirectly via monitoring the output voltage. In step 606 the non-overlapping time duration of the non-overlapping clocks may be modulated. By modulating the non-overlapping time duration of the non-overlapping clocks in response to changes in output current, the input voltage or the reference setting, the output voltage may be regulated while minimizing the potential increase of the output voltage ripple of the DC-DC converter. Consequently a lower value of output capacitance may be used for the same specification of output voltage ripple.

A DC-DC power converter is described having a power converter input for receiving a supply voltage; a power converter output for outputting a converted supply voltage; a reference input for supplying a reference value; a switch capacitor power converter coupled to the power converter input and the power converter output and comprising at least one switchable capacitor controllable by at least two non-overlapping clock signals; a controller coupled to the switch capacitor power converter, and the power converter output. The controller is configured to generate at least two non-overlapping clock signals and to vary the non-overlapping time duration dependent on the voltage and/or current value of at least one of the power converter output, the reference input, and the power converter input. Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A DC-DC power converter comprising:
a switch capacitor power converter coupled to a power converter input, a power converter output, and comprising a switchable capacitor;
a controller coupled to the switch capacitor power converter, wherein the controller is configured to generate two non-overlapping clock signals having different durations, vary a non-overlapping time duration dependent on the voltage and/or current value of at least one of the power converter output, a reference value, and the power converter input, and operation of the switch capacitor power converter is frozen by a pair of multiplexers during the non-overlapping time duration between the two non-overlapping clock signals, wherein each multiplexer receives a respective clock signal of different duration as an input signal.

2. The DC-DC power converter of claim 1, wherein the controller is coupled to the power converter input, the power converter output, and a reference input configured to receive the reference value, and the switch capacitor power converter is controllable by the two non-overlapping clock signals.

3. The DC-DC power converter of claim 1, wherein the controller comprises:
an error detector, wherein the error detector comprises a first input configured to receive the reference value, a second input coupled to the power converter output;
a non-overlapping clock generator coupled to an output of the error detector and configured to vary the clock frequency dependent on the difference between the output voltage and the reference value; and
a control module coupled to an output of the error detector, wherein the control module is configured to generate a modulation control signal for the non-overlapping clock generator.

4. The DC-DC power converter of claim 1, wherein the controller comprises a timing reference generator.

5. The DC-DC power converter of claim 1, wherein the controller is configured to increase the non-overlapping time duration in response to at least one of a decrease in output current supplied by the DC-DC power converter, a decrease in the reference value, and an increase in the input voltage of the DC-DC converter.

6. The DC-DC power converter of claim 1, wherein the controller is configured to decrease the non-overlapping time duration in response to at least one of an increase in the output current supplied by the DC-DC power converter, an increase in the reference value, and a decrease in the input voltage of the DC-DC converter.

7. The DC-DC power converter of claim 1, further comprising:
an output capacitor coupled to the power converter output.

8. The DC-DC power converter of claim 1, wherein all floating capacitors of the switch capacitor power converter are disconnected by the pair of multiplexers during the non-overlapping time duration.

9. The DC-DC power converter of claim 3, wherein each multiplexer of the pair of multiplexers has a first input coupled to a respective output of the non-overlapping clock generator, a second input operably coupled to an off-voltage level, and a control input coupled to the controller, wherein the controller is configured to modulate the non-overlapping time duration by selecting between the first and second inputs in response to a time reference signal.

10. The DC-DC power converter of claim 4, wherein the timing reference generator is configured to generate a time reference signal equal to half of a nominal switching period.

11. The DC-DC power converter of claim 4, wherein the timing reference generator is configured to generate a time reference signal dependent on at least one of a charge time and a discharge time of the switchable capacitor.

12. The DC-DC power converter of claim 4, wherein the timing reference generator is coupled to an oscillator.

13. A method of controlling a DC-DC power converter comprising a switch capacitor power converter having a switchable capacitor, the method comprising:
providing two non-overlapping clocks having different durations to the switch capacitor power converter; and
modulating the non-overlapping time duration of the non-overlapping clocks in dependence on the voltage and/or the current of at least one of the power converter output, the power converter input, and a reference value, wherein operation of the switch capacitor power converter is frozen by a pair of multiplexers during the non-overlapping time duration between the two non-overlapping clocks, wherein each multiplexer receives a respective clock signal of different duration as an input signal.

14. The method of claim 13, further comprising:
decreasing the non-overlapping time duration in response to at least one of an increase of the output current provided by the DC-DC power converter, an increase in the reference value, and a decrease of the input voltage.

15. The method of claim 13, further comprising:
increasing the non-overlapping time duration in response to at least one of a decrease in the output current provided by the DC-DC power converter, a decrease in the reference value, and an increase of the input voltage.

16. The method of claim 13, wherein modulating the non-overlapping time duration further comprises:
generating a time reference signal dependent on at least one of the charge time and discharge time of the switchable capacitor.

17. The method of claim 13, wherein all floating capacitors of the switch capacitor power converter are disconnected by the pair of multiplexers during the non-overlapping time duration.

* * * * *